United States Patent
Lin et al.

(10) Patent No.: US 11,563,344 B2
(45) Date of Patent: Jan. 24, 2023

(54) WIRELESS ENERGY TRANSMITTING APPARATUS, WIRELESS ENERGY RECEIVING APPARATUS, WIRELESS ENERGY SUPPLY METHOD AND SYSTEM

(71) Applicant: BEIJING XIAOMI MOBILE SOFTWARE CO., LTD., Beijing (CN)

(72) Inventors: Xianqi Lin, Beijing (CN); Yajun Pan, Beijing (CN); Shujun Wei, Beijing (CN); Jian Bai, Beijing (CN); Tuyou Yuan, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/083,015

(22) Filed: Oct. 28, 2020

(65) Prior Publication Data

US 2021/0135510 A1  May 6, 2021

(30) Foreign Application Priority Data

Nov. 4, 2019  (CN) .......................... 201911065113.9

(51) Int. Cl.
*H02J 50/90* (2016.01)
*H02J 50/23* (2016.01)
(Continued)

(52) U.S. Cl.
CPC ................ *H02J 50/90* (2016.02); *G01C 3/02* (2013.01); *G01J 5/0025* (2013.01); *G01S 1/08* (2013.01);
(Continued)

(58) Field of Classification Search
None
See application file for complete search history.

(56) References Cited

U.S. PATENT DOCUMENTS

2009/0111483 A1* 4/2009 Fiereizen .................. G01S 1/08
455/456.1
2015/0303701 A1* 10/2015 Terao .................... B60L 53/122
307/104
(Continued)

FOREIGN PATENT DOCUMENTS

CN         201352599 Y   * 11/2009
CN         106716774 A      5/2017
(Continued)

OTHER PUBLICATIONS

Extended European Search Report in Application No. 20205211, dated Mar. 22, 2021.
(Continued)

*Primary Examiner* — Jared Fureman
*Assistant Examiner* — Joel Barnett
(74) *Attorney, Agent, or Firm* — Syncoda LLC; Feng Ma

(57) ABSTRACT

A wireless energy transmitting apparatus includes: a direction-finding and location device configured to determine a position of an energy receiving apparatus based on beacon information of the energy receiving apparatus; an energy generation device configured to generate energy, convert the energy into high-frequency electromagnetic waves having a frequency higher than a predetermined frequency threshold, and transmit the high-frequency electromagnetic waves to the energy receiving apparatus; and a processor configured to control the energy generation device to transmit the high-frequency electromagnetic waves to the energy receiving apparatus based on the position of the energy receiving apparatus. The position of the energy receiving end is determined based on the direction-finding and location device, and the energy generation device is controlled to convert the energy into high-frequency electromagnetic (Continued)

waves having a frequency higher than a predetermined frequency and transmit the same to the energy receiving end.

19 Claims, 8 Drawing Sheets

(51) Int. Cl.
*H02J 50/40* (2016.01)
*H02J 50/60* (2016.01)
*G01C 3/02* (2006.01)
*G01J 5/00* (2022.01)
*G01S 1/08* (2006.01)

(52) U.S. Cl.
CPC .............. *H02J 50/23* (2016.02); *H02J 50/40* (2016.02); *H02J 50/60* (2016.02)

(56) References Cited

U.S. PATENT DOCUMENTS

| | | | | |
|---|---|---|---|---|
| 2016/0094081 | A1* | 3/2016 | Lee | H02J 7/025 320/108 |
| 2016/0294498 | A1* | 10/2016 | Ma | H04L 27/2647 |
| 2017/0077995 | A1* | 3/2017 | Leabman | H02J 50/402 |
| 2017/0141620 | A1* | 5/2017 | Zeine | H04B 5/0037 |
| 2018/0254669 | A1* | 9/2018 | Rahman | H02J 7/00036 |
| 2019/0252899 | A1 | 8/2019 | Rahman et al. | |
| 2019/0334387 | A1 | 10/2019 | Swan | |
| 2019/0341812 | A1* | 11/2019 | Arnstein | B64D 47/00 |

FOREIGN PATENT DOCUMENTS

| | | |
|---|---|---|
| CN | 107017707 A | 8/2017 |
| CN | 108051772 A | 5/2018 |
| EP | 3145052 A1 | 3/2017 |

OTHER PUBLICATIONS

Database Compendex [Online] Engineering Information, Inc., New York, NY, US; Jun. 1, 2019, Mollai S et al:"Wideband two dimensional interferometric direction finding algorithm using base-triangles and a proposed minimum planar array"; XP002802311, International Journal of Electronics and Communications vol. 105, pp. 163-170.

China first office action in Application No. 201911065113.9, dated Jun. 22, 2022.

* cited by examiner

WIRELESS ENERGY TRANSMITTING APPARATUS, WIRELESS ENERGY RECEIVING APPARATUS, WIRELESS ENERGY SUPPLY METHOD AND SYSTEM

CROSS-REFERENCE TO RELATED APPLICATIONS

This disclosure claims priority to Chinese Patent Application No. 201911065113.9 filed on Nov. 4, 2019, the disclosure of which is hereby incorporated by reference in its entirety.

BACKGROUND

Wireless energy supply converts a wired power transmission to a wireless power transmission. A wireless energy supply system using a wireless energy supply technology includes a wireless energy transmitting system and a wireless energy receiving system. The wireless energy transmitting system supplies energy to the wireless energy receiving system wirelessly.

With the increasing development of science and technology today, the demand for electrical energy from electrical equipment is getting higher and higher. The wireless energy supply system avoids complicated connection wires in the wired power transmission, saves wires and cables, and facilitates operations, thereby having abroad application prospects in mobile terminals, vehicles medical equipment, aerospace and other fields and being increasingly favored by people.

SUMMARY

The present disclosure relates to the technical field of wireless energy supply, and more specifically, to a wireless energy transmitting apparatus, a wireless energy receiving apparatus, a wireless energy supply method and a system.

According to an aspect of embodiments of the present disclosure, there is provided a wireless energy transmitting apparatus comprising: a direction-finding and location device, configured to determine a position of an energy receiving apparatus based on beacon information of the energy receiving apparatus; an energy generation device, configured to generate energy, convert the energy into high-frequency electromagnetic waves having a frequency higher than a predetermined frequency threshold, and transmit the high-frequency electromagnetic waves to the energy receiving apparatus; and a processor, configured to control the energy generation device to transmit the high-frequency electromagnetic waves to the energy receiving apparatus based on the position of the energy receiving apparatus determined by the direction-finding and location device.

In some embodiments, the energy generation device comprises: a plurality of transmitting channels and a plurality of antenna units, the plurality of antenna units being two-dimensional phased array antenna arrays with reconfigurable beam direction.

In some embodiments, the wireless energy transmitting apparatus further comprises: a biological detection device comprising an infrared detection device and a laser ranging device, wherein the infrared detection device is configured to detect whether a living creature exists in an energy transmitting range in which the energy transmitting apparatus transmits the energy; and the laser ranging device is configured to determine a position of the living creature when the living creature exists in the energy transmitting range.

In some embodiments, the wireless energy transmitting apparatus further comprises: a power conversion device, configured to complete a conversion from AC to DC and perform a conversion between DCs to supply electric energy required by the wireless energy transmitting apparatus.

According to another aspect of embodiments of the present disclosure, there is provided a wireless energy receiving apparatus comprising: a location device comprising a beacon source and a beacon antenna, the beacon source transmitting beacon information to an energy transmitting apparatus through the beacon antenna, and the beacon information being used to provide the energy transmitting apparatus with orientation information of energy transmitting; a reception device, comprising a receiving antenna array and configured to receive high-frequency electromagnetic waves transmitted by the energy transmitting apparatus; and a signal conversion device comprising a rectifier circuit array and configured to convert the received high-frequency electromagnetic waves into a DC power supply.

According to another aspect of embodiments of the present disclosure, there is provided a wireless energy supply system comprising a wireless energy transmitting apparatus and a wireless energy receiving apparatus; the wireless energy transmitting apparatus comprises the any one of the above wireless energy transmitting apparatus; and the above wireless energy receiving apparatus.

According to another aspect of embodiments of the present disclosure, there is provided a wireless energy supply method, comprising: receiving beacon information of an energy receiving apparatus; determining position information of the energy receiving apparatus based on the beacon information of the energy receiving apparatus; generating energy and converting the energy into high-frequency electromagnetic waves having a frequency higher than a predetermined frequency threshold; and transmitting the high-frequency electromagnetic waves to the energy receiving apparatus based on the position information of the energy receiving apparatus.

In some embodiments, said transmitting the high-frequency electromagnetic waves to the energy receiving apparatus based on the position information of the energy receiving apparatus comprises: determining, based on the position information of the energy receiving apparatus, a beam direction for transmitting the high-frequency electromagnetic waves; and transmitting the high-frequency electromagnetic waves to the energy receiving apparatus based on the beam direction for transmitting the high-frequency electromagnetic waves.

In some embodiments, the wireless energy supply method further comprises: detecting whether a living creature exists in a transmission range of the high-frequency electromagnetic waves; determine a position of the living creature when the living creature exists in a transmission range of the high-frequency electromagnetic waves; and determining attenuation data in the high-frequency electromagnetic waves based on the position of the living creature.

In some embodiments, said transmitting the high-frequency electromagnetic waves to the energy receiving apparatus comprises: transmitting the high-frequency electromagnetic waves to the energy receiving apparatus by using a correlation interferometer method in a uniform circular array form.

In some embodiments, said determining position information of the energy receiving apparatus based on the beacon information of the energy receiving apparatus comprises: determining the position information of the energy receiving apparatus based on a phase difference generated by different antenna array elements which receive the beacon information of a same energy receiving apparatus.

According to another aspect of embodiments of the present disclosure, there is provided a wireless energy supply method, comprising: transmitting beacon information to an energy transmitting apparatus, and the beacon information being used to provide the energy transmitting apparatus with orientation information of energy transmitting; receiving high-frequency electromagnetic waves transmitted by the energy transmitting apparatus based on the beacon information; and converting the received high-frequency electromagnetic waves into corresponding electric energy.

According to another aspect of the embodiments of the present disclosure, there is provided a wireless energy supply apparatus comprising a processor; a memory for storing instructions executable by the processor; wherein the processor is configured to execute any one of the foregoing wireless energy supply methods.

According to another aspect of the embodiments of the present disclosure, there is provided a non-transitory computer-readable storage medium having stored therein instructions that, when executed by a processor of a mobile terminal, causes the mobile terminal to perform any one of the foregoing wireless energy supply methods.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and, serve to explain the principles of the disclosure together with the description.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Microwave energy transmission in the wireless energy supply system can be adopted for medium-distance and long-distance wireless energy supplies. There is a mismatch between the transmission and receiving states of the energy transmitting apparatus and the receiving apparatus in the wireless energy supply system. It is difficult to achieve the accurate positioning and tracking of the energy receiving apparatus during energy transmission, the energy conversion efficiency at the transmitting end is low, and the microwave signal has severe radiative loss in free space such that the overall transmission efficiency is low.

Figure 1:
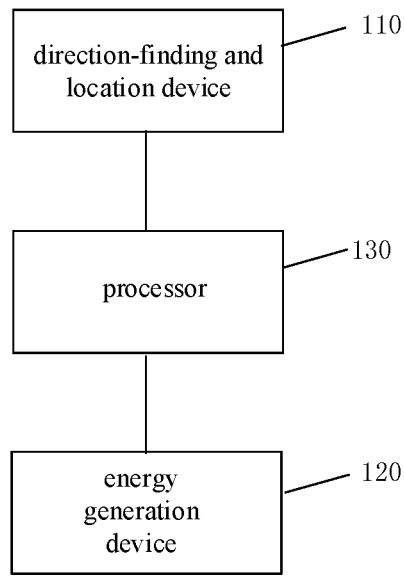
FIG. 1 is a block diagram illustrating a wireless energy transmitting apparatus according to an exemplary embodiment of the present disclosure.

FIG. 1 is a block diagram illustrating a wireless energy transmitting apparatus according to an exemplary embodiment of the present disclosure. As shown in FIG. 1, the wireless energy transmitting apparatus 100 includes: a direction-finding and location device 110, an energy generation device 120, and a processor 130.

The direction-finding and location device 110 is configured to determine the position of the energy receiving apparatus according to the beacon information of the energy receiving apparatus. The direction-finding and location device 110 may be a location receiving antenna array which can include a plurality of antenna array elements.

The energy generation device 120 is configured to generate energy, convert the energy into high-frequency electromagnetic waves having a frequency higher than a predetermined frequency threshold, and transmit the high-frequency electromagnetic waves to the energy receiving apparatus.

For example, the energy generation device 120 may include a signal source device for providing an energy signal, a power amplifier device for amplifying the power of the energy signal from the signal source, and an antenna array device for converting the amplified energy signal to high-frequency electromagnetic waves and transmitting the high-frequency electromagnetic waves to the energy receiving apparatus.

It can be understood that, in order to enable the high-frequency electromagnetic wave beams to be accurately aligned with the position of the energy receiving apparatus and improve the energy conversion efficiency of transmitting apparatus, the energy can be converted to have a frequency higher than a predetermined frequency, that is, the energy is converted to high-energy electromagnetic waves, so as to make the beam radiate more concentrated at a higher power and realize a point-to-point transmission of the beam from the energy transmitting apparatus to the energy receiving apparatus, which ensures the energy to be concentrated on a transmission path and improves the overall efficiency of the wireless energy supply system.

For example, the predetermined frequency threshold of high-frequency electromagnetic waves can be 9.6 GHz, and the frequency of high-frequency electromagnetic waves used for energy supply can also be higher than 9.6 GHz, for example, high-frequency electromagnetic waves can be millimeter waves.

The processor 130 is configured to control the energy transmitting apparatus to transmit the high-frequency electromagnetic waves to the energy receiving apparatus according to the position of the energy receiving apparatus.

According to the embodiments of the present disclosure, based on the position of the energy receiving apparatus determined by the direction-finding and location device, the energy generation device is controlled to convert the energy into high-frequency electromagnetic waves having a frequency higher than a predetermined frequency and transmit the high-frequency electromagnetic waves to the energy receiving apparatus, thereby solving the problems of low transmission efficiency of the overall wireless energy supply system, and improving the user experience.

In some embodiments, the energy generation device 120 includes a plurality of transmitting channels and a plurality of antenna units, and a plurality of antenna units are two-dimensional phased array antenna arrays with reconfigurable beam direction.

A specific antenna can only receive beams in a certain direction in space and radiate beams in a certain direction into space. The current of the antenna is changed through a phase shifter for radiating beams in different directions in space, which is called a phased array antenna array.

The energy generation device 120 may adopt a phased array technology, for example, including a plurality of transmitting channels and a plurality of antenna units, and a plurality of transmitting channels can include 144 transmitting channels and 144 antenna units. A power amplifier circuit of each of the plurality of transmitting channels is in a full-power operating state, so as to maximize the power efficiency. The phase of the transmitting channel is accurately controlled by a six-bit phase shifter to ensure the phase consistency.

The transmitting channel can be provided with a negative electrical protection circuit and a temperature protection circuit to improve the reliability and stability of the power amplifier device. On the basis of ensuring performance, the efficiency of the transmitting apparatus of the wireless energy supply system can be improved, and the overall efficiency of the wireless energy supply system can be further improved.

A plurality of antenna units can be a two-dimensional phased array antenna array that can be reconstructed by using a beam of a fixed structure, which can quickly and accurately obtain the position information of the energy receiving apparatus, and achieve an accurate pointing by controlling the high-frequency electromagnetic waves to radiate to the energy receiving end.

Figure 2:
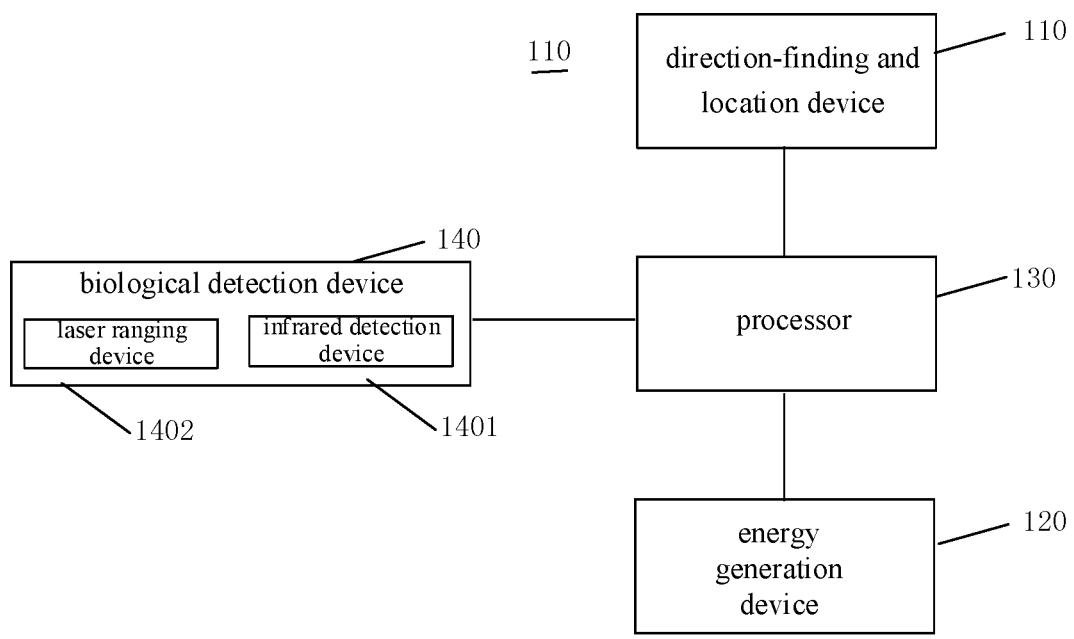
FIG. 2 is a block diagram illustrating a wireless energy transmitting apparatus according to another exemplary embodiment of the present disclosure.

FIG. 2 is a block diagram illustrating a wireless energy transmitting apparatus according to another exemplary embodiment of the present disclosure. As shown in FIG. 2, the wireless energy transmitting apparatus 100 further includes a biological detection device 140, and the biological detection device 140 includes an infrared detection device 1401 and a laser ranging device 1402. The infrared detection device 1401 is configured to detect whether a living creature exists in an energy transmitting range in which the wireless energy transmitting apparatus 100 transmits the energy. When the living creature exists in the energy transmitting range, the laser ranging device 1402 is used to determine a position of the living creature.

The infrared detection device 1401 detects whether a living creature exists in an energy transmitting range in which the wireless energy transmitting apparatus 100 transmits the energy by sensing the temperature change in the energy transmitting range.

When a living creature exists in an energy transmitting range in which the wireless energy transmitting apparatus 100 transmits the energy, the laser ranging device 1402 performs a distance measurement on the living creature, and measures the distance between the wireless energy transmitting apparatus 100 and the detected living creature. Based on the distance between the wireless energy transmitting apparatus 100 and the detected living creature, attenuation data in transmitting the high-frequency electromagnetic waves is determined, that is, the transmitting power of high-frequency electromagnetic waves is reduced, so as to effectively protect the living creature from being harmed by the electromagnetic wave radiation.

Figure 3:
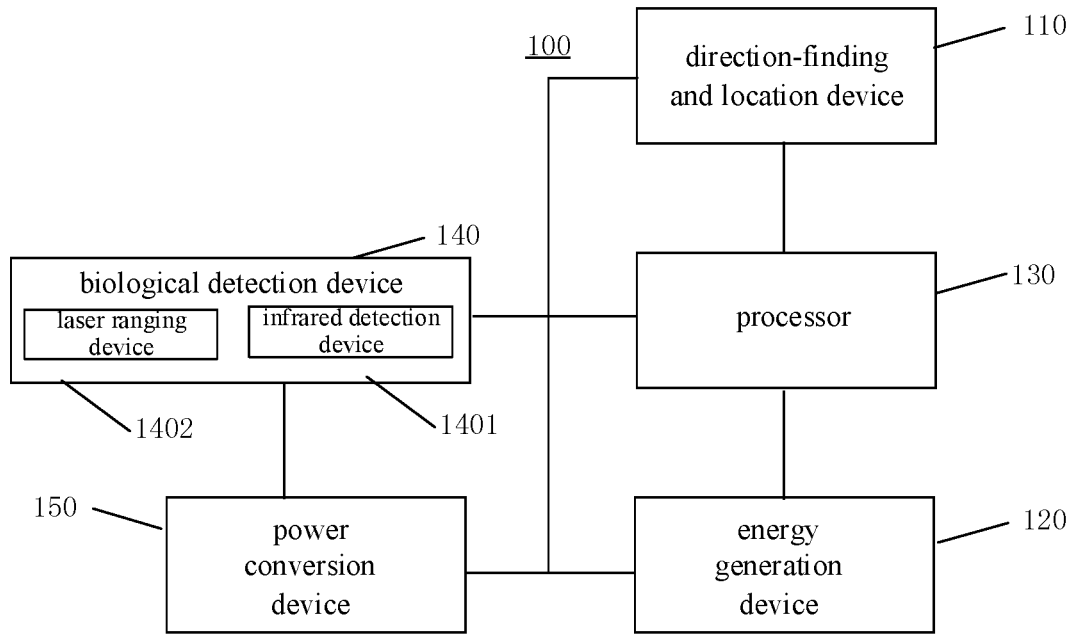
FIG. 3 is a block diagram illustrating a wireless energy transmitting apparatus according to another exemplary embodiment of the present disclosure.

FIG. 3 is a block diagram illustrating a wireless energy transmitting apparatus according to another exemplary embodiment of the present disclosure. As shown in FIG. 3, the wireless energy transmitting apparatus 100 further includes a power conversion device 150, which is configured to complete a conversion from AC power to DC power and perform a conversion between the DC power to supply electric energy required by the wireless energy transmitting apparatus 100.

Figure 4:
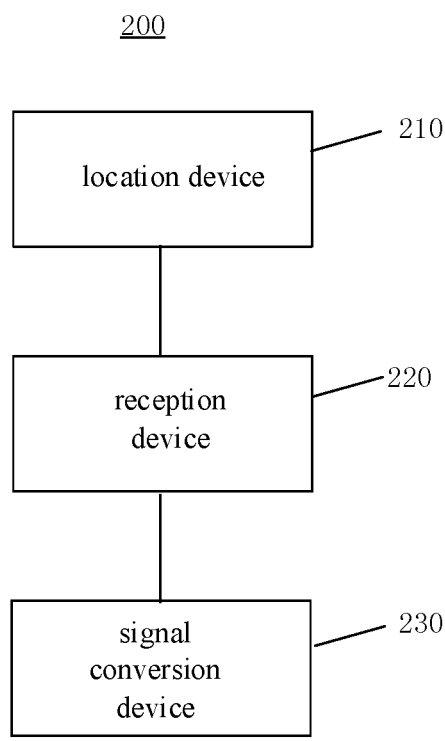
FIG. 4 is a block diagram illustrating a wireless energy receiving apparatus according to another exemplary embodiment of the present disclosure.

FIG. 4 is a block diagram illustrating a wireless energy receiving apparatus according to another exemplary embodiment of the present disclosure. As shown in FIG. 4, the wireless energy receiving apparatus 200 includes: a location device 210, a reception device 220, and a signal conversion device 230.

The location device 210 includes a beacon source and a beacon antenna. The beacon source transmits beacon information to the wireless energy transmitting apparatus 100 through the beacon antenna, and the beacon information is used to provide orientation information of energy transmitting to the wireless energy transmitting apparatus 100, so that wireless energy transmitting apparatus 100 can determine the precise position of the wireless energy receiving apparatus 200.

The receiving device 220 includes a receiving antenna array and is configured to receive high-frequency electromagnetic waves transmitted by the wireless energy transmitting apparatus 100. It can be understood that, the receiving antenna array of the receiving device 220 can be a transmission array arrangement corresponding to the energy generation device. For example, the energy generation device 120 of the energy transmitting apparatus includes 144 transmitting channels and 144 antenna units, and accordingly, the receiving antenna array of the receiving device 220 includes 144 receiving antenna units, which further ensures the transmission efficiency of wireless energy supply and avoids the mismatch between the receiving antennas and transmitting antennas.

The conversion device 230 includes a rectifier circuit array, and is configured to convert the received high-frequency electromagnetic waves into corresponding electric energy.

Figure 5:
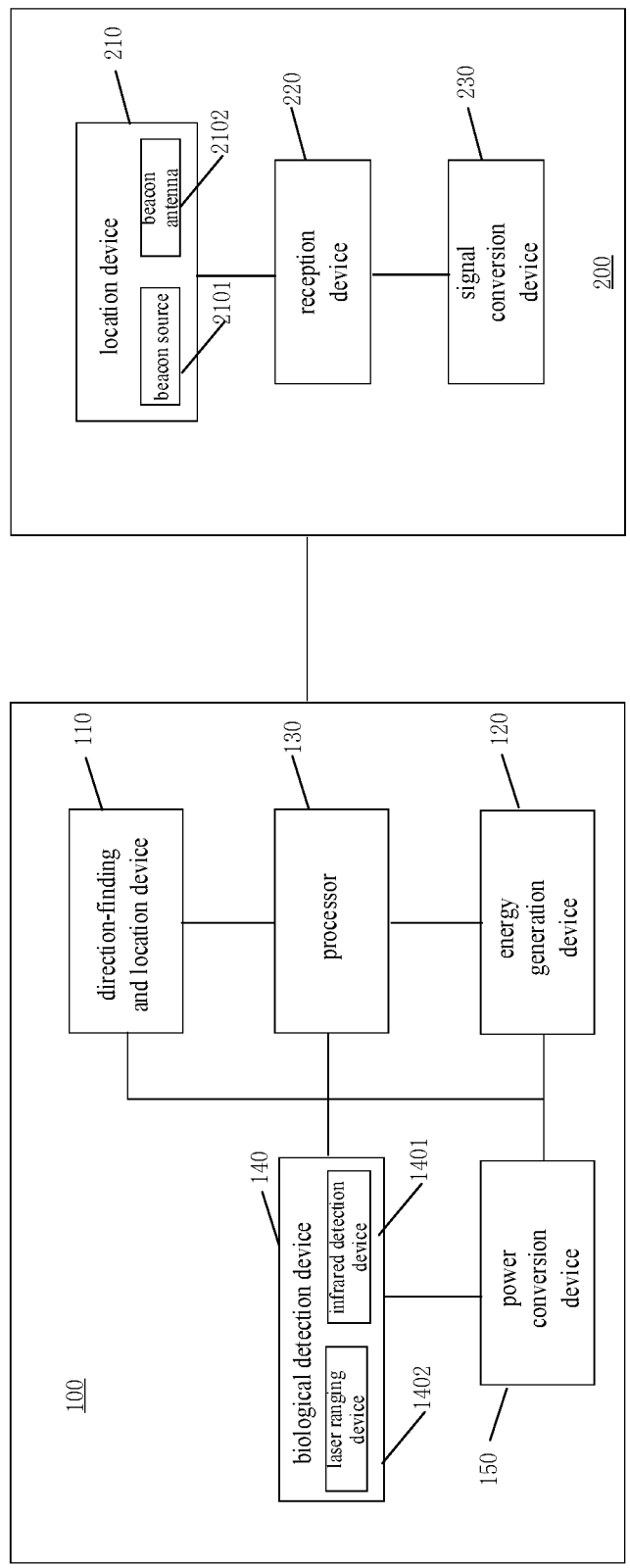
FIG. 5 is a schematic diagram illustrating an implementation of a wireless energy supply system according to an exemplary embodiment of the present disclosure.

FIG. 5 is a schematic diagram illustrating an implementation of a wireless energy supply system according to an exemplary embodiment of the present disclosure. The wireless energy supply system includes a wireless energy transmitting apparatus 100 and a wireless energy receiving apparatus 200. The wireless energy transmitting apparatus 100 includes a direction-finding and location device 110, an energy generation device 120, a processor 130, a biological detection device 140, and a power conversion device 150. The biological detection device 140 includes an infrared detection device 1401 and a laser ranging device 1402.

The wireless energy receiving apparatus 200 includes: a location device 210, a receiving device 220, and a signal conversion device 230. The location device 210 includes a beacon source 2101 and a beacon antenna 2102.

The beacon source 2101 of the wireless energy receiving apparatus 200 transmits the beacon information to the wireless energy transmitting apparatus 100 through the beacon antenna 2102. The beacon information is used to provide the wireless energy transmitting apparatus 100 with the orientation information of energy transmitting, so that the wireless energy transmitting apparatus 100 can determine the precise position of the wireless energy receiving apparatus 200.

The power conversion device 150 of the wireless energy transmitting apparatus 100 converts AC power to DC power, and performs the conversion between DC power to provide the wireless energy transmitting apparatus 100 with the electric energy required for work. The direction-finding and location device 110 included in the wireless energy transmitting apparatus 100 determines the position of the energy receiving apparatus 200 based on the beacon information of the energy receiving apparatus, and the processor 130 controls, based on the position of the energy receiving apparatus 200, the signal sources included in the energy generation device 120 to generate energy signals. The energy signals is amplified by the power amplifier, and the amplified signal is converted into high-frequency electromagnetic waves by the transmitting antenna array, and transmitted to the wireless energy receiving apparatus 200.

The infrared detection device 1401 included in the wireless energy transmitting apparatus 100 detects whether a living creature exists in an energy transmitting range in which the wireless energy transmitting apparatus 100 transmits the energy. When a living creature exists in the energy transmitting range, the laser ranging device 1402 is used to determine the position of the living creature. The processor 130 determines the attenuation data of high-frequency electromagnetic waves based on the position of the living creature. The energy generation device 120 is controlled to transmit the high-frequency electromagnetic waves to the wireless energy receiving apparatus 200 based on the attenuated data.

The receiving device 220 of the wireless energy receiving apparatus 200 receives high-frequency electromagnetic waves. The signal conversion device 230 converts the high-frequency electromagnetic waves into electric energy. The electric energy is subjected to a series of rectification and filtering, and the voltage and current of the electric energy are converted to an electric energy form that meets a voltage and a current required by the wireless energy receiving apparatus 200 for outputting, thereby supplying the energy requirement of the wireless energy receiving apparatus 200.

Figure 6:
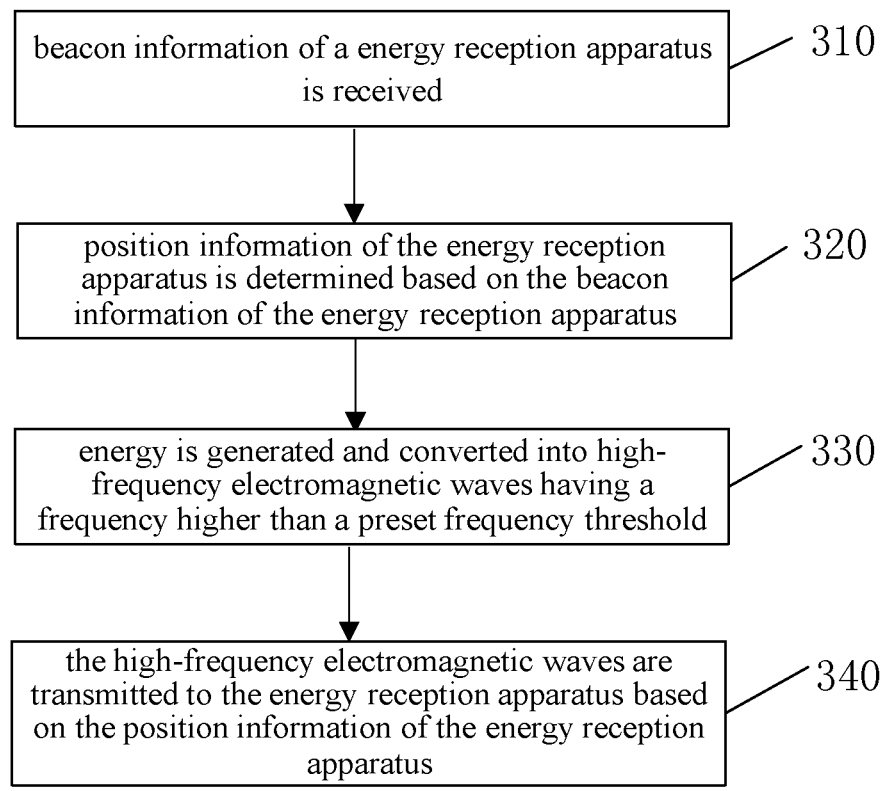
FIG. 6 is a schematic diagram illustrating a wireless energy supply method according to an exemplary embodiment of the present disclosure.

FIG. 6 is a flowchart illustrating a wireless energy supply method according to an exemplary embodiment of the present disclosure. The wireless energy supply method is applied to the aforementioned wireless energy supply system. As shown in FIG. 6, the wireless energy supply method includes the following steps.

In step S310, beacon information of an energy receiving apparatus is received.

The beacon information is used to provide the position information of the energy receiving apparatus.

The energy receiving apparatus can be one, two or more. The energy receiving apparatus includes a beacon source. When the energy receiving apparatus has an energy demand, the beacon source transmits the beacon information to the energy receiving apparatus.

The energy receiving apparatus can also transmit beacon information to the energy receiving apparatus from time to time, and the beacon information can be a digital signal that provides position information of the energy receiving apparatus.

It can be understood that there is a predetermined relationship between the energy receiving apparatus and the energy transmitting apparatus. For example, one or two or more energy receiving apparatuses and energy transmitting apparatuses are matched with each other through beacon information. The matched energy transmitting apparatuses can supply energy to the energy receiving apparatus.

According to the position information of the energy receiving apparatus, the energy is respectively transmitted to the energy receiving apparatus in the form of high-frequency electromagnetic waves having a frequency higher than a predetermined frequency.

In step S320, position information of the energy receiving apparatus is determined according to the beacon information of the energy receiving apparatus.

The energy transmitting apparatus can include a direction-finder antenna switch matrix. The energy transmitting apparatus starts a receiving channel of the direction-finder antenna switch matrix to receive beacon information, starts a data processing algorithm to perform the digital signal processing on the beacon information, and determines the position information of the energy receiving apparatus through the processed beacon information, so as to achieve an accurate location of the energy receiving apparatus. The position information can be represented by, for example, spatial coordinates of an energy receiving apparatus.

In step S330, energy is generated and converted into high-frequency electromagnetic waves having a frequency higher than a predetermined frequency threshold.

In step S340, the high-frequency electromagnetic waves are transmitted to the energy receiving apparatus based on the position information of the energy receiving apparatus.

For example, when there are multiple energy receiving apparatuses, the energy transmitting apparatus transmits high-frequency electromagnetic waves to the energy receiving apparatuses based on the number of energy receiving apparatuses and the position information of the energy receiving apparatuses.

In some embodiments of the present disclosure, a beam direction of transmitting high-frequency electromagnetic waves is determined based on the position information of the energy receiving apparatuses, and the high-frequency electromagnetic waves are transmitted to the energy receiving apparatus based on the beam direction of transmitting high-frequency electromagnetic waves.

The energy transmitting apparatus determining a timing relationship of transmitting high-frequency electromagnetic waves and a beam direction of transmitting high-frequency electromagnetic waves based on the position information of multiple energy receiving apparatuses, includes: adjusting the specific orientation of the phased array antenna array that transmits the high-frequency electromagnetic waves and pitch angle information of the antenna array that transmits the high-frequency electromagnetic waves, determining the beam direction relationship in the transmission of the high-frequency electromagnetic waves, controlling the transmitting power value of the transmitting phased array system, and determining the timing relationship between various components that transmit and receive the high-frequency electromagnetic waves. The energy transmitting apparatus transmits high-frequency electromagnetic waves to the energy receiving apparatus.

Figure 7:
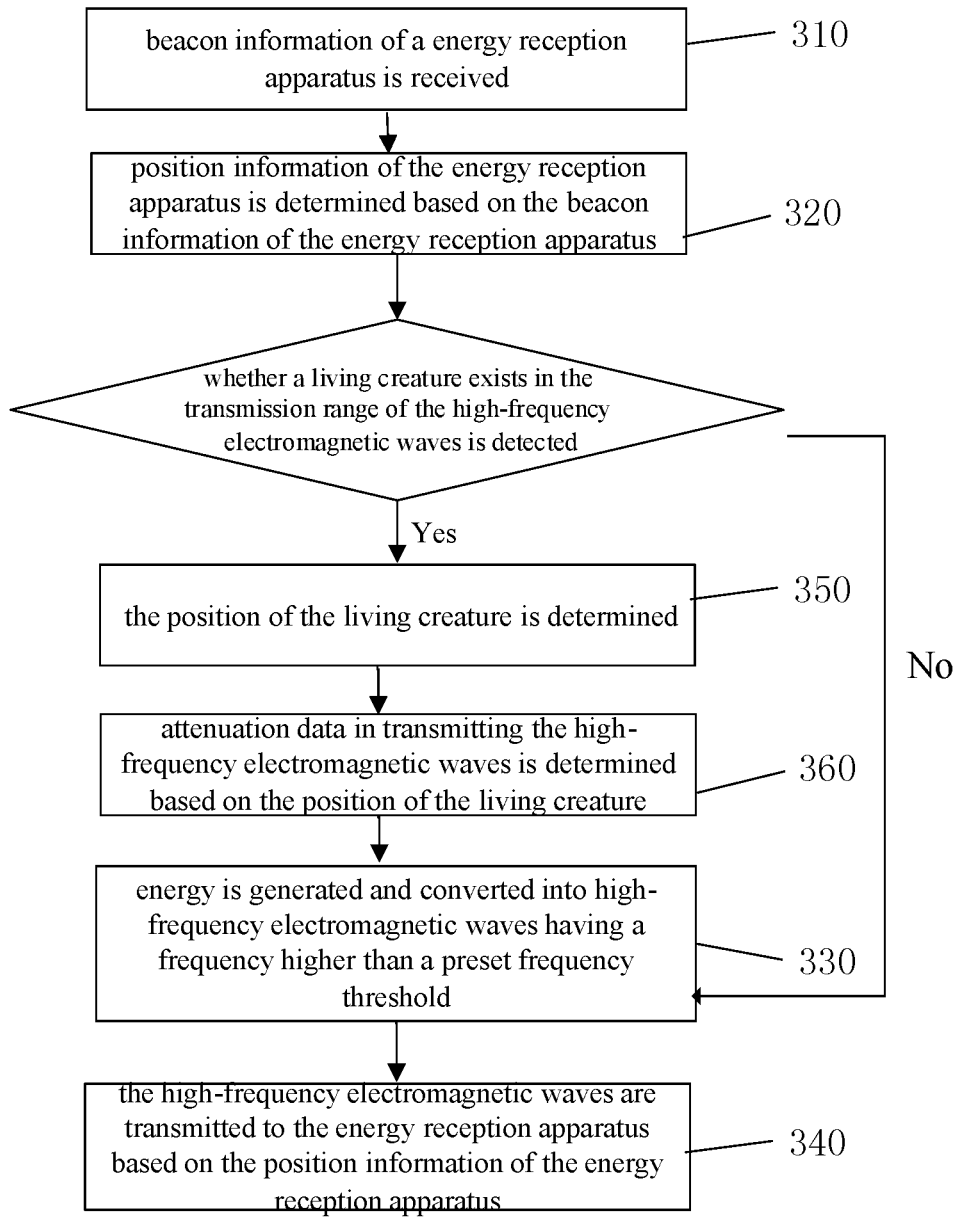
FIG. 7 is a flowchart illustrating a wireless energy supply method according to another exemplary embodiment of the present disclosure.

FIG. 7 is a flowchart illustrating a wireless energy supply method according to another exemplary embodiment of the present disclosure. As shown in FIG. 7, in addition to the above steps, the wireless energy supply method further includes: detecting whether a living creature exists in a transmission range of high-frequency electromagnetic waves.

When it is detected that a living creature exists in the transmission range of the high-frequency electromagnetic waves, step S350 is performed to determine the position of the living creature.

In step S360, attenuation data in transmitting the high-frequency electromagnetic waves is determined based on the position of the living creature.

High-power high-frequency electromagnetic waves will have a certain impact on the safety of humans or animals and the surrounding environment. The method also includes detecting whether a living creature exists in the energy transmitting range. An infrared detection device can be used, and the infrared detection device determines whether a living creature exists in the energy transmitting range by sensing the temperature change in the energy transmitting range.

When a living creature exists in the energy transmitting range, a laser ranging device can be used to perform the distance measurement on the living creatures to measure the distance between the energy transmitting apparatus and the detected living creatures. Based on the distance between the energy transmitting apparatus and the detected living creature, attenuation data in transmitting the high-frequency electromagnetic waves is determined, that is, the transmitting power of high-frequency electromagnetic waves is reduced, thereby effectively protecting the living creature from being harmed by the electromagnetic wave radiation.

In some embodiments, based on the position information of the energy receiving apparatus, the high-frequency electromagnetic waves are transmitted to the energy receiving apparatus by using a correlation interferometer method in a uniform circular array form.

The correlation interferometer method in a uniform circular array form can be used to avoid the fuzzy process of energy transmitting, and weaken the attenuation of the transmission energy caused by non-ideal factors such as noise, amplitude inconsistency, and mutual coupling among the transmitting antenna arrays of the energy transmitting apparatus. The influence of the antenna polarization beam width on the system can be overcome, higher accuracy and sensitivity of the direction-finder can be obtained, the amount of calculation is relatively small, the consumed resources are less, and the response time is short.

In some embodiments, the position information of the energy receiving apparatus is determined based on a phase difference generated by different receiving antenna array elements which receive the beacon information of the same energy receiving apparatus.

The energy transmitting apparatus can include a location receiving antenna array. The location receiving antenna array includes a plurality of location receiving antenna array elements. There will be a phase difference between different antenna array elements which receive the beacon information sent by the same energy receiving apparatus. Two antenna array elements with a distance of d in the location receiving antenna array are selected to receive the beacon information transmitted by the same energy receiving apparatus. The orientation information of the energy receiving apparatus is determined by comparing the phase differences generated by the two antenna array elements in response to the beacon information. The beacon information transmitted by the energy receiving apparatus, for example, can be X-band, 12 GHz, or other frequency signals.

Figure 8:
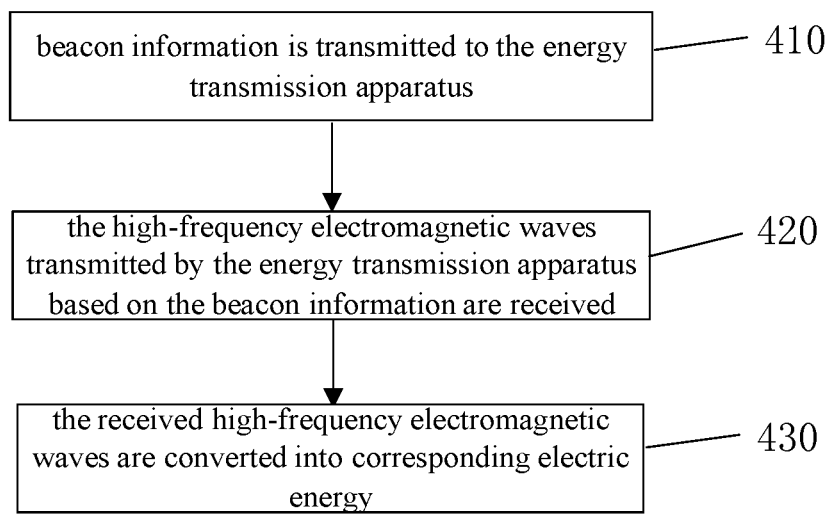
FIG. 8 is a flowchart illustrating a wireless energy supply method according to another exemplary embodiment of the present disclosure.

FIG. 8 is a flowchart illustrating a wireless energy supply method applied to a wireless energy receiving apparatus according to another exemplary embodiment of the present disclosure. As shown in FIG. 8, the wireless energy supply method includes the following steps.

In step S410, the beacon information is transmitted to the energy transmitting apparatus, and the beacon information is used to provide the orientation information of energy transmitting to the energy transmitting apparatus.

The wireless energy receiving apparatus can include a beacon source and a beacon antenna. The beacon source transmits the beacon information to the wireless energy transmitting apparatus through the beacon antenna, and the beacon information is used to provide orientation information of energy transmitting to the energy transmitting apparatus, so that the wireless energy transmitting apparatus can determine the precise position of the wireless energy receiving apparatus.

The energy receiving apparatus can also transmit beacon information to the energy receiving apparatus from time to time, and the beacon information can be a digital signal that provides position information of the energy receiving apparatus.

It can be understood that there is a predetermined relationship between the energy receiving apparatus and the energy transmitting apparatus. For example, one or two or more energy receiving apparatuses and energy transmitting apparatuses are matched with each other through beacon information. The energy supply can be performed between the matched energy transmitting apparatuses and the energy receiving apparatus.

In step S420, the high-frequency electromagnetic waves transmitted by the energy transmitting apparatus based on the beacon information are received.

In step S430, the received high-frequency electromagnetic waves are converted into corresponding electric energy. The receiving device of the wireless energy receiving apparatus receives the high-frequency electromagnetic waves. The signal conversion device converts the high-frequency electromagnetic waves into electric energy. The electric energy undergoes a series of rectification and filtering to convert the voltage and current of the electric energy to an electric energy form which satisfies the voltage and the current required by the wireless energy receiving apparatus for outputting, so as to supply the energy required by the wireless energy receiving apparatus.

Figure 9:
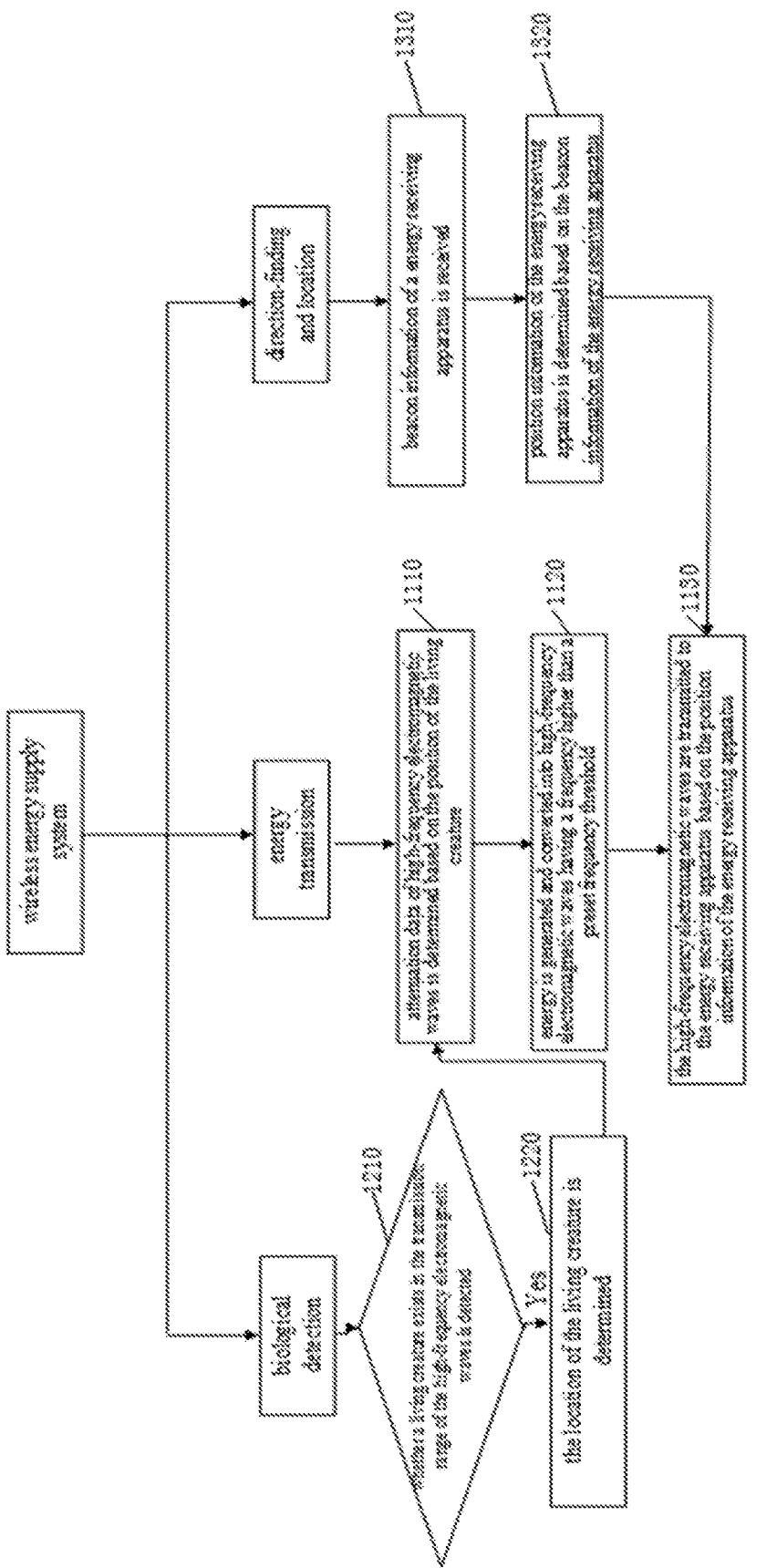
FIG. 9 is a flowchart illustrating a wireless energy supply method according to an exemplary embodiment of the present disclosure.

FIG. 9 is a flowchart of a wireless energy supply method according to an exemplary embodiment of the present disclosure. As shown in FIG. 9, the wireless energy supply system 1000 includes three subsystems, i.e., biological detection, energy transmission, and direction-finding and location, and the three subsystems cooperate with each other to realize the process of energy transmitting.

The direction-finding and location system receives the beacon information transmitted by the beacon source of the energy receiving apparatus, and determines position information of the energy receiving apparatus based on the beacon information of the energy receiving apparatus.

In step S1310, beacon information of the energy receiving apparatus is received.

The beacon information is used to provide orientation information of energy transmitting to the energy transmitting apparatus.

In step S1320, position information of the energy receiving apparatus is determined according to the beacon information of the energy receiving apparatus.

The biological detection system determines whether there is an activity trajectory of a living creature in the transmission range of the high-frequency electromagnetic waves by sensing the external temperature change. When the presence of the living creature is detected, the precise distance measurement is performed on the living creature, and the attenuate data of the high-frequency electromagnetic waves is determined based on the distance of the living creature in a safe range, so as to protect living creatures from radiation hazards.

In step S1210, it is detected whether a living creature exists in the transmission range of the high-frequency electromagnetic waves.

When a living creature is detected in the transmission range of the high-frequency electromagnetic waves, step S1220 is executed, so as to determine the position of the living creature.

The direction-finder algorithm is completed; the specific orientation and pitch angle information of the transmitting phased array system is provided; the transmission timing relationship and beam steering relationship are determined; and the transmitting phased array system is accurately controlled to complete the energy transmission. At the same time, the processing of detection data of the living creature is completed, and the magnitude of the output power of the transmitting phased array system is controlled based on the test results.

The energy transmitting system adopts phased array technology to generate energy through 144 transmitting channels and antenna units, converts the energy into high-frequency electromagnetic waves having a frequency higher than a predetermined frequency threshold, and realizes precise direction through beam control to transmit the high-frequency electromagnetic waves to the energy receiving apparatus.

In step S110, the energy transmitting system determines attenuation data in transmitting high-frequency electromagnetic waves based on the position of the living creature.

In step S1120, energy is generated and converted into high-frequency electromagnetic waves having a frequency higher than a predetermined frequency threshold.

In step S1130, the high-frequency electromagnetic waves are transmitted to the energy receiving apparatus based on the position information of the energy receiving apparatus.

Figure 10:
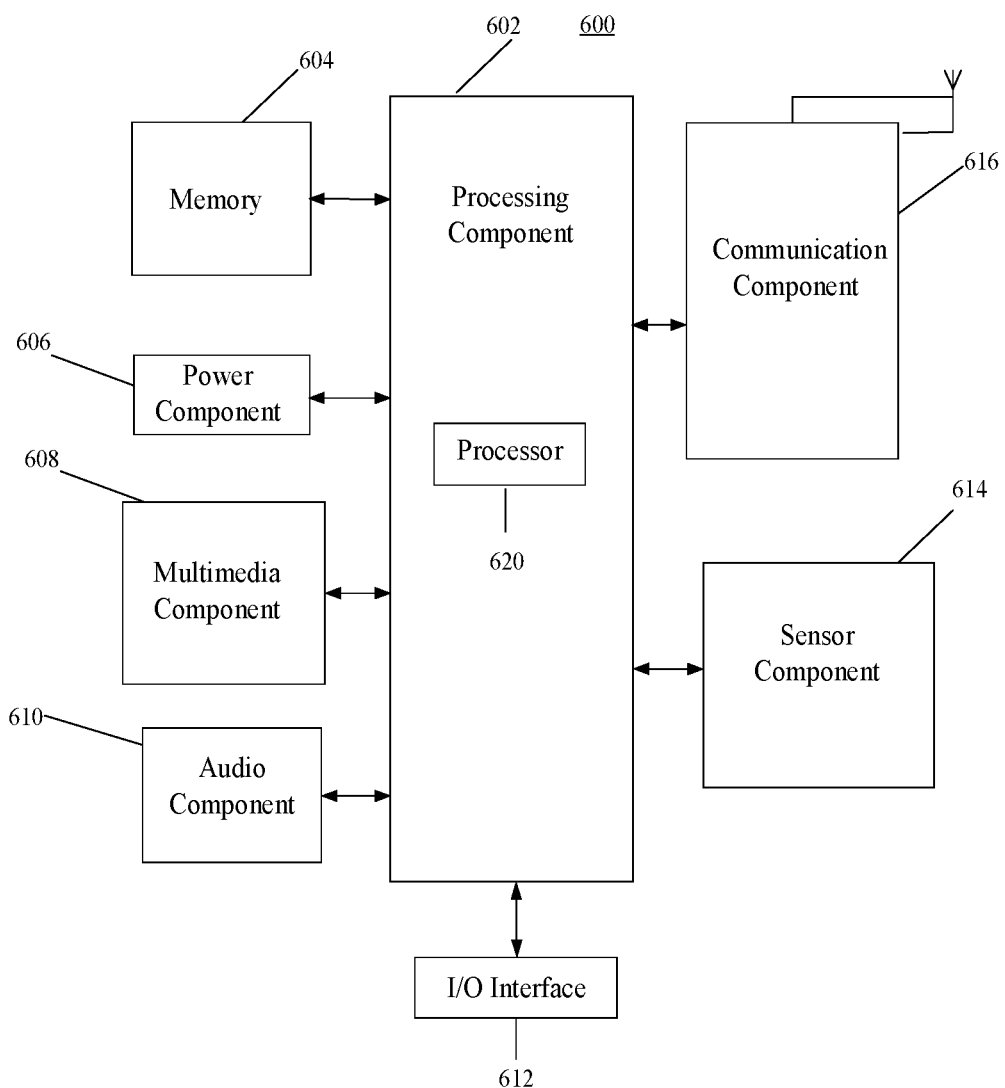
FIG. 10 is a block diagram of an apparatus according to an exemplary embodiment of the present disclosure.

FIG. 10 is a block diagram of a wireless energy receiving apparatus, according to an exemplary embodiment. For example, the wireless energy receiving apparatus 600 can be a mobile phone, a computer, a digital broadcast terminal, a messaging device, a gaming console, a tablet, a medical device, fitness equipment, a personal digital assistant, and the like.

Referring to FIG. 10, the wireless energy receiving apparatus 600 can include one or more of the following components: a processing component 602, a memory 604, a multimedia component 608, an audio component 610, an input/output (I/O) interface 612, a sensor component 614, and a communication component 616. The wireless energy supply apparatus can be a part of energy component 606. The energy component 606 provides power, and can include a power management system, one or more power sources, and any other components associated with the generation, management, and distribution of energy in the device 600.

The processing component 602 typically controls overall operations of the wireless energy receiving apparatus 600, such as the operations associated with display, telephone calls, data communications, camera operations, and recording operations. The processing component 602 can include one or more processors 620 to execute instructions so as to complete all or part of the steps in the above described methods. Moreover, the processing component 602 can include one or more devices which facilitate the interaction between the processing component 602 and other components. For instance, the processing component 602 can include a multimedia device to facilitate the interaction between the multimedia component 608 and the processing component 602.

The memory 604 is configured to store various types of data to support the operation of the wireless energy receiving apparatus 600. Examples of such data include instructions for any applications or methods operated on the wireless energy receiving apparatus 600, contact data, phonebook data, messages, pictures, video, etc. The memory 604 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The multimedia component 608 includes a screen providing an output interface between the wireless energy receiving apparatus 600 and the user. In some embodiments, the screen can include a liquid crystal display (LCD) and a touch panel (TP). In some embodiments, the screen may include an organic light-emitting diode (OLED) display or other types of displays.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 608 includes a front camera and/or a rear camera. The front camera and the rear camera can receive external multimedia data while the wireless energy receiving apparatus 600 is in an operation mode, such as a photographing mode or a video mode. Each of the front camera and the rear camera can be a fixed optical lens system or have focus and optical zoom capability.

The audio component 610 is configured to output and/or input audio signals. For example, the audio component 610 includes a microphone ("MIC") configured to receive external audio signals when the wireless energy receiving apparatus 600 is in an operation mode, such as a call mode, a recording mode, and a voice recognition mode. The received audio signals can be further stored in the memory 604 or transmitted via the communication component 616. In some embodiments, the audio component 610 further includes a speaker to output audio signals.

The I/O interface 612 provides an interface between the processing component 602 and peripheral interface devices, such as a keyboard, a click wheel, buttons, and the like. The buttons can include, but are not limited to, a home button, a volume button, a starting button, and a locking button.

The sensor component 614 includes one or more sensors for providing status assessments of various aspects of the wireless energy receiving apparatus 600. For instance, the sensor component 614 can detect an open/closed status of the wireless energy receiving apparatus 600, relative positioning of components, e.g., the display and the keypad, of the wireless energy receiving apparatus 600, the sensor component 614 can also detect a change in position of the wireless energy receiving apparatus 600 or a component of the wireless energy receiving apparatus 600, a presence or absence of user contact with the wireless energy receiving apparatus 600, an orientation or an acceleration/deceleration of the wireless energy receiving apparatus 600, and a change in temperature of the wireless energy receiving apparatus 600. The sensor component 614 can include a proximity sensor configured to detect the presence of nearby objects without any physical contact. The sensor component 614 can also include a light sensor, such as a CMOS or CCD image sensor, for use in imaging applications. In some embodiments, the sensor component 614 can also include an accelerometer sensor, a gyroscope sensor, a magnetic sensor, a pressure sensor, or a temperature sensor.

The communication component 616 is configured to facilitate wired or wireless communication, between the wireless energy receiving apparatus 600 and other devices. The wireless energy receiving apparatus 600 can access a wireless network based on a communication standard, such as Wi-Fi, 2G, 3G, 4G, 5G and a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) device to facilitate short-range communications. For example, the NFC device can be implemented based on a radio frequency identification (RFID) technology, an infrared data association (IrDA) technology, an ultra-wideband (UWB) technology, a Bluetooth (BT) technology, and other technologies.

In exemplary embodiments, there is also provided a non-transitory computer-readable storage medium including instructions, such as the memory 604 including instructions, executable by the processor 620 in the wireless energy receiving apparatus 600, for performing the above-described methods. For example, the non-transitory computer-readable storage medium can be a ROM, a RAM, a CD-ROM, a magnetic tape, a floppy disc, an optical data storage device, and the like.

Various embodiments of the present disclosure can have one or more of the following advantages. The position of the energy receiving apparatus is determined based on the direction-finding and location apparatus, then the energy generation device is controlled to convert the energy into high-frequency electromagnetic waves having a frequency higher than a predetermined frequency and transmit the high-frequency electromagnetic waves to the energy receiving apparatus, thereby solving the problems of low transmission efficiency of the overall wireless energy supply system, and improving the user experience.

The various device components, devices, modules, units, blocks, or portions may have modular configurations, or are composed of discrete components, but nonetheless can be referred to as "modules" in general. In other words, the "components," "devices," "modules," "blocks," "portions," or "units" referred to herein may or may not be in modular forms.

Other implementation solutions of the present disclosure will be apparent to those skilled in the art from consideration of the specification and practice of the embodiments of the present disclosure. This disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

In the embodiments of the present disclosure, the feed object of each feed port is changed through a shift function of the radio frequency switch, thereby forming different antenna arrays in different states and extending coverage of the antenna array. Compared with the technical solution that each antenna array includes fixed array elements in the related art, an arraying manner for the antenna array in the embodiment of the present disclosure is more flexible.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A wireless energy transmitting apparatus, comprising:
a direction-finding and location device, configured to determine a position of an energy receiving apparatus based on beacon information of the energy receiving apparatus;
an energy generation device, configured to generate energy, convert the energy into high-frequency electromagnetic waves having a frequency higher than a predetermined frequency threshold to enable the high-frequency electromagnetic wave beams to be accurately aligned with the position of the energy receiving apparatus, and transmit the high-frequency electromagnetic waves to the energy receiving apparatus; and
a processor, configured to control the energy generation device to transmit the high-frequency electromagnetic waves to the energy receiving apparatus based on the position of the energy receiving apparatus determined by the direction-finding and location device,
wherein the energy generation device comprises a plurality of transmitting channels and a plurality of antenna units, the plurality of antenna units being two-dimensional phased array antenna arrays with reconfigurable beam direction, and
wherein a power amplifier circuit of each of the plurality of transmitting channels is in a full-power operating state, so as to maximize the power efficiency.

2. The wireless energy transmitting apparatus according to claim 1, wherein the wireless energy transmitting apparatus further comprises:
a biological detection device comprising an infrared detection device and a laser ranging device,
wherein the infrared detection device is configured to detect whether a living creature exists in an energy transmitting range in which the energy transmitting apparatus transmits the energy; and
the laser ranging device is configured to determine a position of the living creature when the living creature exists in the energy transmitting range.

3. The wireless energy transmitting apparatus according to claim 1, wherein the wireless energy transmitting apparatus further comprises:
a power conversion device, configured to complete a conversion from AC to DC and perform a conversion from DC to DC to supply electric energy required by the wireless energy transmitting apparatus.

4. A wireless energy supply system comprising the wireless energy transmitting apparatus of claim 1, and a wireless energy receiving apparatus comprising:
a location device comprising a beacon source and a beacon antenna, the beacon source transmitting beacon information to an energy transmitting apparatus through the beacon antenna, and the beacon information being used to provide the energy transmitting apparatus with orientation information of energy transmitting;
a reception device, comprising a receiving antenna array and configured to receive high-frequency electromagnetic waves transmitted by the energy transmitting apparatus; and
a signal conversion device comprising a rectifier circuit array and configured to convert the received high-frequency electromagnetic waves into a DC power supply.

5. The wireless energy supply system according to claim 4, wherein the energy generation device comprises:
a plurality of transmitting channels and a plurality of antenna units, the plurality of antenna units being two-dimensional phased array antenna arrays with reconfigurable beam direction.

6. The wireless energy supply system according to claim 4, wherein the wireless energy transmitting apparatus further comprises:
a biological detection device comprising an infrared detection device and a laser ranging device,
wherein the infrared detection device is configured to detect whether a living creature exists in an energy transmitting range in which the energy transmitting apparatus transmits the energy; and
the laser ranging device is configured to determine a position of the living creature when the living creature exists in the energy transmitting range.

7. The wireless energy supply system according to claim 6, wherein in response to a presence of the living creature, the precise distance measurement is performed on the living creature, the wireless energy supply system is configured to determine attenuate data of the high-frequency electromagnetic waves based on the position of the living creature, so as to protect the living creature from radiation hazards.

8. The wireless energy supply system according to claim 4, wherein the wireless energy transmitting apparatus further comprises:
a power conversion device, configured to complete a conversion from AC to DC and perform a conversion from DC to DC to supply electric energy required by the wireless energy transmitting apparatus.

9. The wireless energy supply system according to claim 4, wherein wireless energy transmitting apparatus is configured to transmit the high-frequency electromagnetic waves to the energy receiving apparatus by using a correlation interferometer method in a uniform circular array form.

10. The wireless energy supply system according to claim 9, wherein the predetermined frequency threshold of the high-frequency electromagnetic waves is about 9.6 GHz, and the high-frequency electromagnetic waves are millimeter waves.

11. A wireless energy receiving apparatus, comprising:
a location device comprising a beacon source and a beacon antenna, the beacon source transmitting beacon information to an energy transmitting apparatus through the beacon antenna, and the beacon information being used to provide the energy transmitting apparatus with orientation information of energy transmitting;
a reception device, comprising a receiving antenna array including a plurality of receiving antenna units corresponding to a plurality of antenna units of the energy transmitting apparatus and configured to receive high-frequency electromagnetic waves having a frequency higher than a predetermined frequency threshold transmitted by the energy transmitting apparatus to enable the high-frequency electromagnetic wave beams to be accurately aligned with a position of the energy receiving apparatus; and
a signal conversion device comprising a rectifier circuit array and configured to convert the received high-frequency electromagnetic waves having a frequency higher than a predetermined frequency threshold into DC power,
wherein the plurality of receiving antenna units are two-dimensional phased array antenna arrays with reconfigurable beam directions.

12. A wireless energy supply method of the wireless energy receiving apparatus of claim 11, comprising:

transmitting beacon information to an energy transmitting apparatus, and the beacon information being used to provide the energy transmitting apparatus with orientation information of energy transmitting;

receiving high-frequency electromagnetic waves having a frequency higher than a predetermined frequency threshold transmitted by the energy transmitting apparatus based on the beacon information to enable the high-frequency electromagnetic wave beams to be accurately aligned with a position of the energy receiving apparatus; and converting the received high-frequency electromagnetic waves into corresponding electric energy.

13. A wireless energy supply method, comprising:

receiving beacon information of an energy receiving apparatus;

determining position information of the energy receiving apparatus based on the beacon information of the energy receiving apparatus;

generating energy and converting the energy into high-frequency electromagnetic waves having a frequency higher than a predetermined frequency threshold to enable the high-frequency electromagnetic wave beams to be accurately aligned with a position of the energy receiving apparatus; and transmitting the high-frequency electromagnetic waves to the energy receiving apparatus based on the position information of the energy receiving apparatus through a plurality of transmitting channels and a plurality of antenna units, the plurality of antenna units being two-dimensional phased array antenna arrays with reconfigurable beam directions, wherein a power amplifier circuit of each of the plurality of transmitting channels is in a full-power operating state, so as to maximize the power efficiency.

14. The wireless energy supply method according to claim 13, wherein said transmitting the high-frequency electromagnetic waves to the energy receiving apparatus based on the position information of the energy receiving apparatus comprises:

determining, based on the position information of the energy receiving apparatus, a beam direction for transmitting the high-frequency electromagnetic waves; and transmitting the high-frequency electromagnetic waves to the energy receiving apparatus based on the beam direction for transmitting the high-frequency electromagnetic waves.

15. The wireless energy supply method according to claim 14, further comprising:

detecting whether a living creature exists in a transmission range of the high-frequency electromagnetic waves;

determine a position of the living creature when the living creature exists in a transmission range of the high-frequency electromagnetic waves; and determining attenuation data in transmitting the high-frequency electromagnetic waves based on the position of the living creature.

16. The wireless energy supply method according to claim 13, wherein said transmitting the high-frequency electromagnetic waves to the energy receiving apparatus comprises:

transmitting the high-frequency electromagnetic waves to the energy receiving apparatus by using a correlation interferometer method in a uniform circular array form.

17. The wireless energy supply method according to claim 13, wherein said determining position information of the energy receiving apparatus based on the beacon information of the energy receiving apparatus comprises:

determining the position information of the energy receiving apparatus based on a phase difference generated by different antenna array elements which receive the beacon information of a same energy receiving apparatus.

18. A wireless energy supply apparatus implementing the method of claim 13, comprising:

a processor;

memory storing instructions for execution by the processor to implement operations of the wireless energy supply method.

19. A non-transitory computer-readable storage medium having stored therein instructions that, when executed by a processor of a mobile terminal, causes the mobile terminal to perform the wireless energy supply method of claim 13.

* * * * *